United States Patent [19]
Iimura

[11] Patent Number: 5,900,719
[45] Date of Patent: May 4, 1999

[54] BATTERY PACK CHARGER HAVING A FAIL-SAFE HEAT-SENSITIVE SWITCH FOR PREVENTING OVERCHARGE

[75] Inventor: Yoshio Iimura, Hitachinaka, Japan

[73] Assignee: Hitachi Koki Co., Ltd., Tokyo, Japan

[21] Appl. No.: 09/032,118

[22] Filed: Feb. 27, 1998

[30] Foreign Application Priority Data

Feb. 28, 1997 [JP] Japan ..................................... 9-045398

[51] Int. Cl.[6] ...................................................... H02J 7/00
[52] U.S. Cl. ............................................ 320/154; 320/113
[58] Field of Search ..................................... 320/150, 151, 320/152, 154, 107, 113, 112; 429/62

[56] References Cited

U.S. PATENT DOCUMENTS 5,689,173  11/1997  Oosaki et al. ............................ 320/154

*Primary Examiner*—Stuart N. Hecker
*Assistant Examiner*—K. Shin
*Attorney, Agent, or Firm*—Sughrue, Mion, Zinn, Macpeak & Seas, PLLC

[57] ABSTRACT

A battery pack charger has an external frame provided with an insertion slot for inserting a battery pack. A charging terminal and a charging control circuit are housed in the external frame. A heat-sensitive switch is provided between the charging terminal and the charging control circuit. A lead wire is provided between the charging terminal and the heat-sensitive switch. The lead wire has a length appropriate for not losing the effect of heat transferred along the lead wire. The battery pack charger is capable of reliably charging a battery pack without the occurrence of overcharge, even if the battery pack is not provided with a heat-sensitive switch.

13 Claims, 5 Drawing Sheets

BATTERY PACK CHARGER HAVING A FAIL-SAFE HEAT-SENSITIVE SWITCH FOR PREVENTING OVERCHARGE

BACKGROUND OF THE INVENTION

1. Field of the Invention

The present invention relates to a battery pack charger capable of charging a battery pack while preventing the occurrence of overcharging. The term "battery pack" as used herein contains a plurality of battery cells connected in series and covered by an external frame typically formed of resin, and is provided with both charging and discharging terminals.

2. Description of the Prior Art

Technology for rechargeable batteries and rapid charging of such batteries has become more and more advanced in recent years, thereby greatly increasing the use of portable battery-powered equipment such as cordless electric tools. When rapidly charging batteries, it is essential that the charging operation is stopped when the battery has reached a full charge. If rapid charging is continued after the battery has reached a full charge, the battery may become extremely hot, causing damage to the battery or even the breakout of fire. The extremely high temperatures caused from such overcharging may also deform the external frame or damage the control circuit of the battery charger.

Battery chargers are provided with a charging control circuit for terminating the charging operations when the battery has become fully charged but there is always a possibility that this control circuit will malfunction. For this reason, it is necessary to provide an overcharge prevention mechanism that is separate from the control circuit. Conventionally, this overcharge prevention mechanism has been accomplished using a heat-sensitive switch within a battery pack.

FIG. 1 is a circuitry diagram showing the state when a conventional battery pack 10 is connected to a battery charger 1. The battery pack 10 includes a plurality of battery cells 11 connected in series; a charging terminal 13; a charging/discharging terminal 12; a discharging terminal 13a; and a heat-sensitive switch 9 connected between the charging terminal 13 and the positive polarity of the battery cells 11. The battery pack 10 has an outer appearance as shown in FIG. 3.

During charging operations, a terminal 8 of the battery charger 1 is connected to the charging terminal 13 of the battery pack 10, and a terminal 7 of the battery charger 1 is connected to the charging/discharging terminal 12 of the battery pack 10. The charging current flows in a path from the charging terminal 13, to the heat-sensitive switch 9, the plurality of battery cells 11, and the charging/discharging terminal 12.

The discharging terminal 13a is exclusively used during discharging operations. That is, a battery-powered equipment is used while connecting it to the discharging terminal 13a.

In a battery charging system having the above-described construction, if the charging control circuit of the battery charger is incapable of properly terminating the charging operation for any reason, the resulting abnormal heat emitted from the plurality of battery cells 11 will cause the heat-sensitive switch 9 to open, effectively stopping the charging operation. If the heat-sensitive switch 9 is designed to open at an operating temperature of approximately 80° C., no substantial performance loss will be incurred to the battery cells 11.

The heat-sensitive switch 9 contained in the battery pack 10 serves as a fail-safe element so that this type of the battery pack 10 will never be overcharged. However, when charging a battery pack that does not contain a heat-sensitive switch 9, the occurrence of overcharge will not be prevented unless the battery charger 1 properly terminates the charging operation.

To overcome this problem, a battery charger 1 as shown in FIG. 2 has been proposed. As shown in the drawing, this battery charger 1 includes external frames 1a and 1b; a control circuit board 3 housed within the external frames 1a and 1b; terminals 7 and 8 (terminal 8 is not shown); and a heat-sensitive switch 9. The heat-sensitive switch 9 is mounted on the control circuit board 3 and inserted into an opening 15 provided in the external frame 1a so that heat emitted from the battery cells 11 is transferred to the switch 9 via the external frame 1a.

The battery pack 10 is provided with an external frame 14; battery cells 11 housed in the external frame 14; and terminals 12 and 13 (terminal 13 is not shown) fused to the positive and negative electrodes, respectively of the battery cells 11. The battery pack 10 is inserted into an insertion opening formed in the external frame 1a of the battery charger 1.

The heat-sensitive switch 9 prevents overcharge of the battery cells 11 by stopping the charging operation when the switch detects an abnormal amount of heat emitting from the battery cells 11. Heat from the battery cells 11 is transferred to the heat-sensitive switch 9 both via the battery pack terminals 12 and 13, the battery charger terminals 7 and 8, and the control circuit board 3, and via the external frame 14 of the battery pack 10 and the external frame 1a of the battery charger 1. When this transferred heat increases the temperature of the heat-sensitive switch 9 above a predetermined value, the heat-sensitive switch 9 opens to stop the charging operation.

However, the amount of heat transferred via the external frames 14 and 1a is extremely small, and the heat transferred via the control circuit board 3 is cooled by the same, causing the amount of heat actually transferred to the heat-sensitive switch 9 to be much smaller than the heat emitted from the battery cells 11. Hence, by the time the heat-sensitive switch 9 is activated, the battery cells 11 have reached an abnormal temperature that could potentially cause the battery cells 11 to overcharge, deform the external frames 14 and 1a, and damage the control circuit.

SUMMARY OF THE INVENTION

In view of the foregoing, it is an object of the present invention to provide a battery charger capable of accurately detecting abnormal heat generated from the battery pack and capable of preventing deformation of the external frames of the battery pack and the battery charger and capable also of preventing heat damage to the control circuit of the battery charger.

These and other objects of the present invention will be attained by providing a heat-sensitive switch between the charging terminal and the charging control circuit and by connecting the charging terminal to the heat-sensitive switch with a lead wire having an appropriate length that will effectively transfer heat from the battery cells to the heat-sensitive switch without diminishing the effects of the heat.

In accordance with one aspect of the invention, there is provided a battery pack charger that includes an external frame, a first charging terminal, a second charging terminal, a charging control circuit, a heat-sensitive switch, a first lead wire, and a second lead wire. The external frame is provided with an insertion slot for inserting a battery pack. The battery pack includes a battery that consists of a plurality of battery cells connected in series. Such battery has a first polarity and a second polarity opposite the first polarity. The first charging terminal is connected to the first polarity of the battery and the second charging terminal is connected to the second polarity of the battery when the battery pack is inserted into the insertion slot. The charging control circuit is housed in the external frame. The charging control circuit charges the battery and stops the charging operation when the battery is fully charged. However, when the charging control circuit malfunctions, the battery will be overcharged. The heat-sensitive switch is provided to detect abnormal heat generated from the battery when the battery is overcharged. The heat-sensitive switch is connected between the first charging terminal and the charging control circuit. This switch operates to disconnect the charging control circuit from the first charging terminal when the heat-sensitive switch exceeds a predetermined temperature, thereby stopping the charging operation. The first lead wire connects the first charging terminal and the heat-sensitive switch. The first lead wire has a length that does not substantially lose heat transferring from the battery pack to the heat-sensitive switch along the first lead wire. The second lead wire connects the second charging terminal and the charging control circuit.

The external frame of the charger is formed with an opening in an inner side thereof for inserting the heat-sensitive switch.

A third lead wire is further provided which connects the charging control circuit and the heat-sensitive switch. The third lead wire has a length that does not substantially lose heat transferring from the charging control circuit to the heat-sensitive switch along the third lead wire.

The first charging terminal is provided in a position closer to the heat-sensitive switch than the second charging terminal.

The heat-sensitive switch is separated from the battery pack by a first partition wall constituting a part of the external frame of the charger. Heat generated from the battery is transferred to the heat-sensitive switch via the first partition wall. The heat-sensitive switch is also separated from the charging control circuit by a second partition wall constituting another part of the external frame of the charger.

As described, heat channels are provided that minimize heat loss when heat generated from the battery and the charging control circuit is transferred to the heat-sensitive switch. The heat channels include the first lead wire, the third lead wire, and the first partition wall, and the second partition wall.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENT

A battery pack charger according to a preferred embodiment of the present invention will be described while referring to FIGS. 4 and 5.

Figure 2:
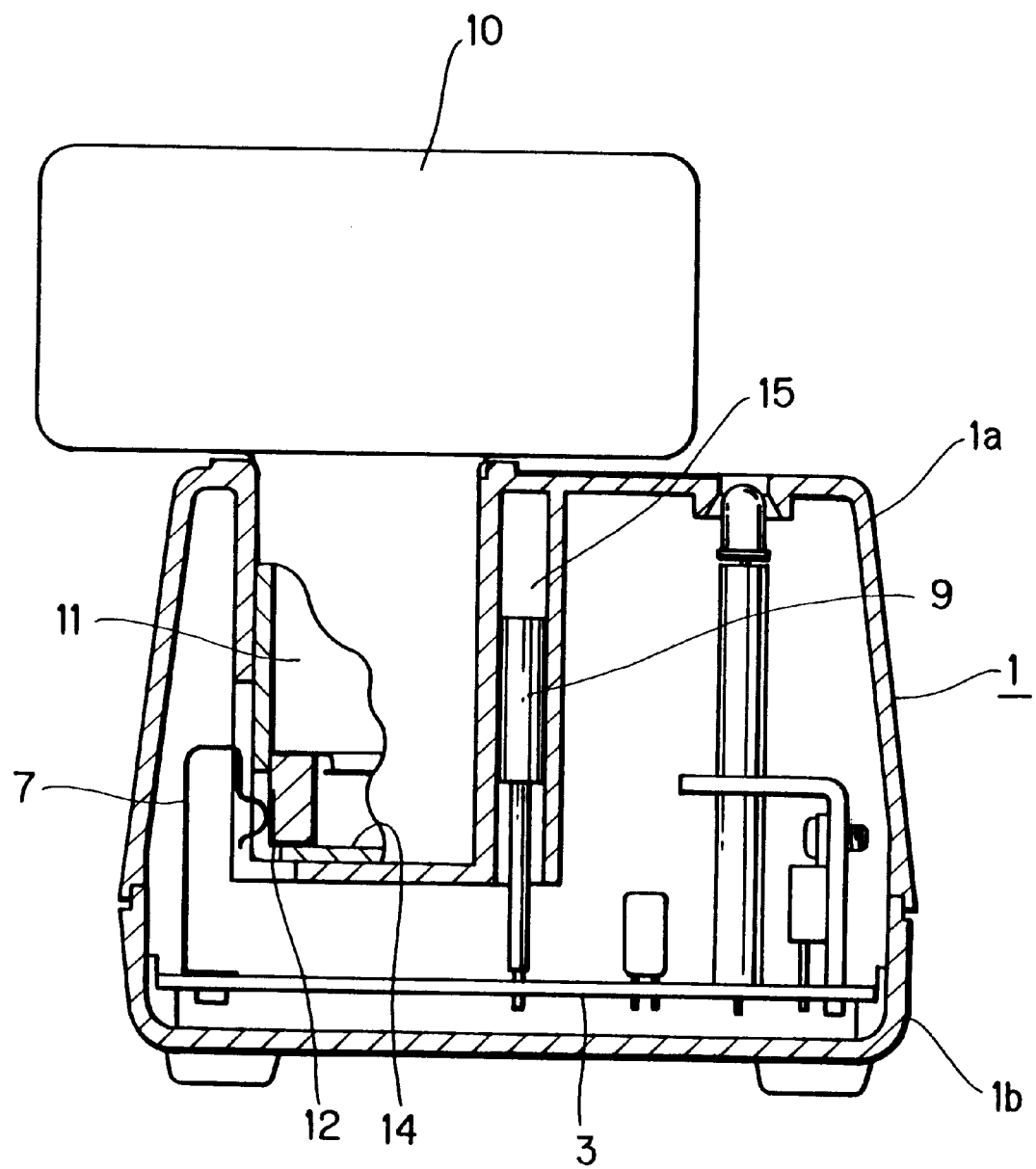
FIG. 2 is a cross-sectional view showing a conventional battery charger connected to a battery pack.
Figure 3:
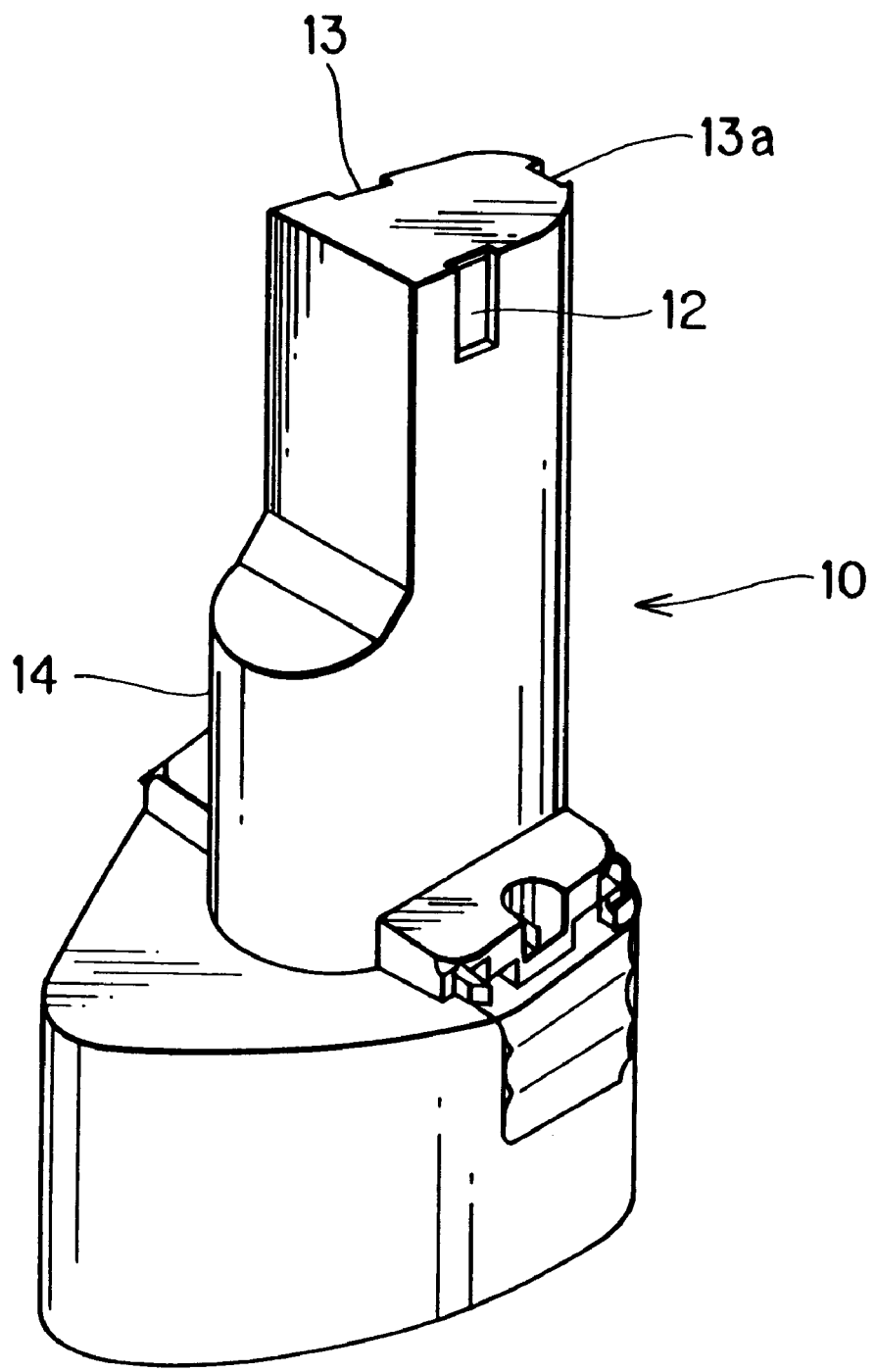
FIG. 3 is a perspective view showing one example of a battery pack.
Figure 4:
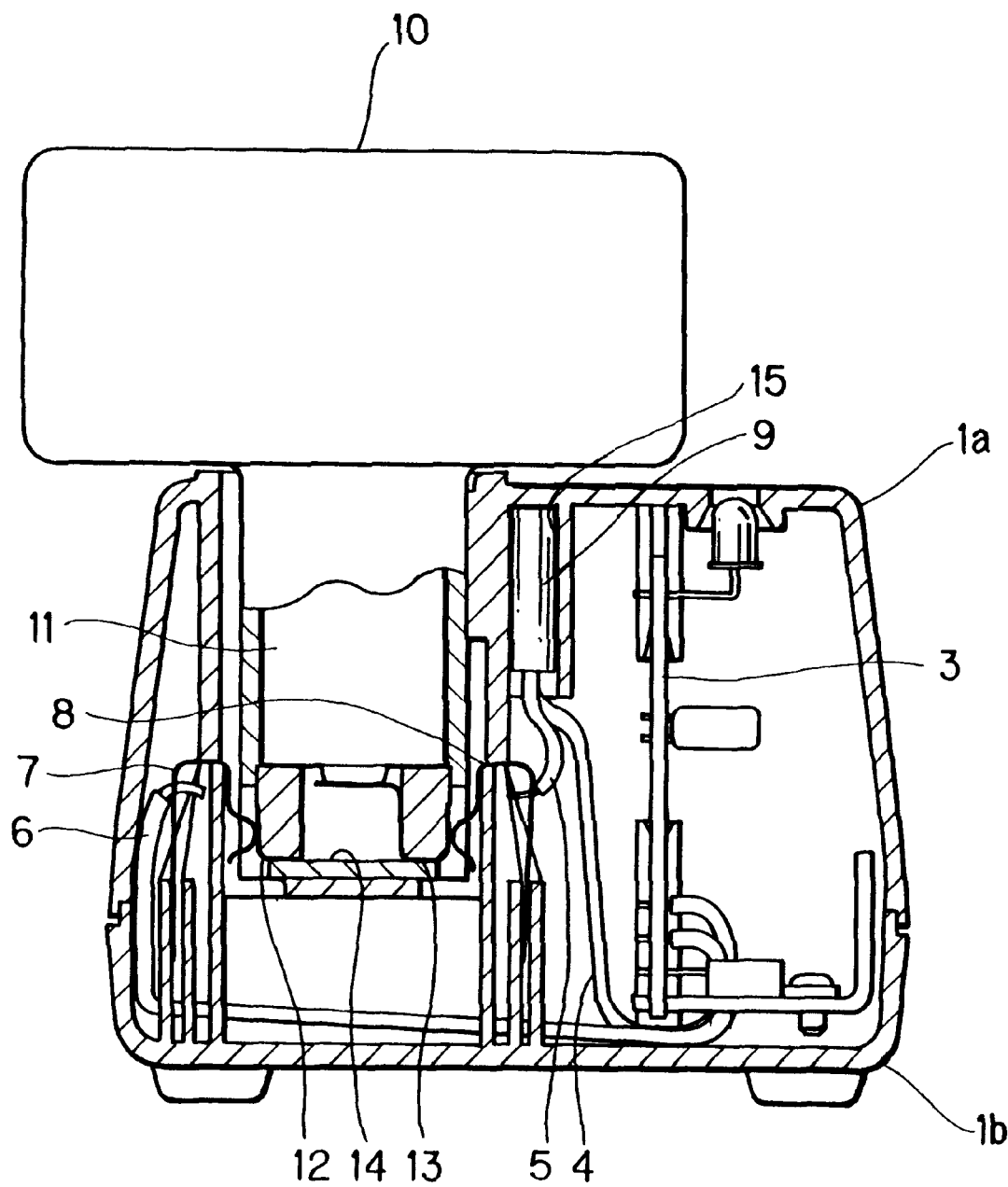
FIG. 4 is a cross-sectional view showing a battery charger according to the preferred embodiment of the present invention.

As shown in FIG. 4, a battery charger 1 is provided with external frames 1a and 1b; a control circuit board 3; terminals 7 and 8; and a heat-sensitive switch 9, as described in the conventional battery charger of FIG. 2. However, the heat-sensitive switch 9 is not mounted directly on the control circuit board 3. Instead, a lead wire 5 having a length appropriate for transferring heat from the battery cells 11 without losing the effects of that heat is connected between one end of the heat-sensitive switch 9 and the terminal 8. A lead wire 4 also of appropriate length connects the other end of the heat-sensitive switch 9 to the control circuit board 3. A lead wire 6 connects the terminal 7 to the control circuit board 3. The battery pack 10 is substantially the same as the battery pack 10 described in FIG. 3.

As mentioned above, the lead wires 4 and 5 are set to lengths short enough that the effects of heat transferred from the control circuit board 3 to the heat-sensitive switch 9 and from the terminal 8 to the heat-sensitive switch 9 are not lost.

Figure 5:
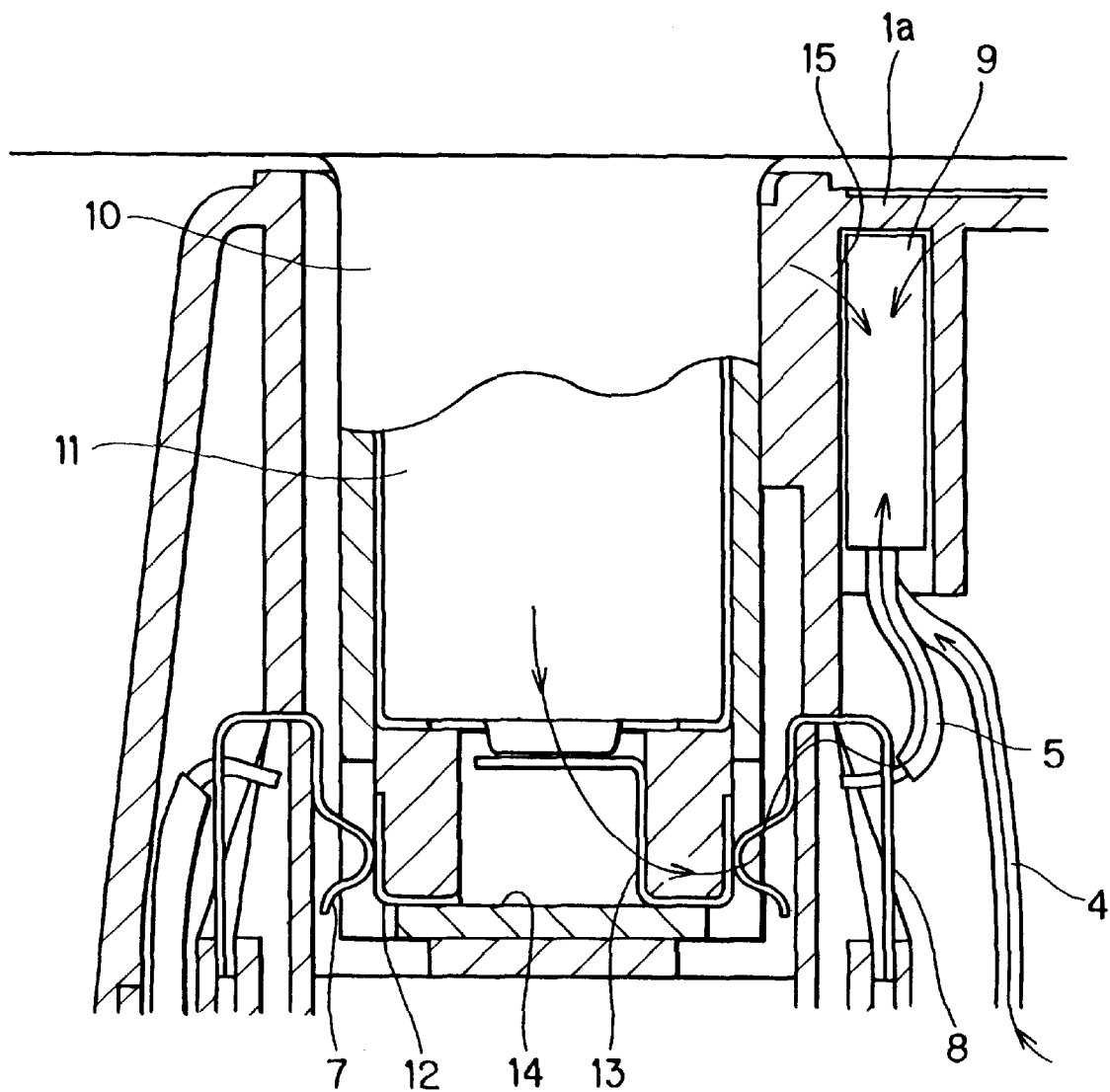
FIG. 5 is an enlarged view showing the relevant parts of the battery charger in FIG. 4.

FIGS. 4 and 5 show the state in which the battery pack 10 is connected to the battery charger 1. When charging begins, the charging current flows along a path in the order control circuit on the board 3, lead wire 4, heat-sensitive switch 9, lead wire 5, terminal 8, charging terminal 13 of the battery pack 10, battery cells 11, terminal 12 of the battery pack 10, terminal 7, lead wire 6, and back to the control circuit.

When the battery cells 11 reach a fully charged state, normally the control circuit stops the charging operation. However, if the control circuit malfunctions and fails to stop the charging, the battery cells 11 begin to overcharge, causing the temperature of the battery cells 11 to rise abnormally. This rise in temperature in turn causes the temperatures of the control circuit and the external frame 1a to rise abnormally The arrows in FIG. 5 indicate how heat from the battery cells 11 is transferred to the heat-sensitive switch 9. As shown, heat is transferred to the heat-sensitive switch 9 from the battery cell 11 via the charging terminal 13, terminal 8, and lead wire 5; from the external frame 1a; and from the control circuit via the lead wire 4. The heat activates the heat-sensitive switch 9, causing the switch to open and stop the charging operation before performance of the battery cell 11 is degraded, before the external frame 1a is deformed, and before the control circuit is damaged.

The opening 15 provided in the external frame 1a for inserting the heat-sensitive switch 9 increases the thermal effect of the external frame 1a on the heat-sensitive switch 9, causing the heat-sensitive switch 9 to be activated in the early stages of overcharging.

In addition, the thermal effect of the control circuit on the heat-sensitive switch 9 is also increased, because the lead wire 4 connecting the control circuit board 3 and the heat-sensitive switch 9 is set to an appropriately short length, causing the heat-sensitive switch 9 to be activated in the early stages of overcharging. To further increase the thermal effect of the control circuit, it is desirable that the lead wire 4 be connected to a portion in proximity to the heat generating components on the control circuit board 3, such as SCR, rectifying diodes, battery voltage detecting resistors.

In the above-described embodiments a heat-sensitive switch 9 having an operating temperature of 80° C. is used so as to terminate the charging operations when the temperature of the battery cells 11 increases as high as 100 to 110° C. The property of the battery cells 11 will be degraded if their temperature increases up to about 120° C. There exists heat loss of at least 20 to 30° C. between the battery cells 11 and the heat-sensitive switch 9. However, such degree of heat loss is inevitable and considered to be minimum. The lead wire 5 for connecting the charging terminal 8 and the heat-sensitive switch 9 should have a cross-section of 0.5 to 0.75 mm² and a length of 30 to 80 mm, and the lead wire 4 for connecting the heat-sensitive switch 9 and the charging control circuit, a cross-section of 0.5 to 0.75 mm² and a length of 50 to 150 mm.

As described above, a battery pack charger according to the present invention is capable of reliably charging a battery pack without overcharging the same, even if the battery pack is not provided with a heat-sensitive switch. This is possible because the battery pack charger effectively transfers heat generated from the battery cells in the battery pack to the heat-sensitive switch via lead wires. Hence, the battery pack charger can prevent deformation of the external frames of the battery pack and battery charger, as well as heat damage to the control circuit in the battery charger.

Figure 1:
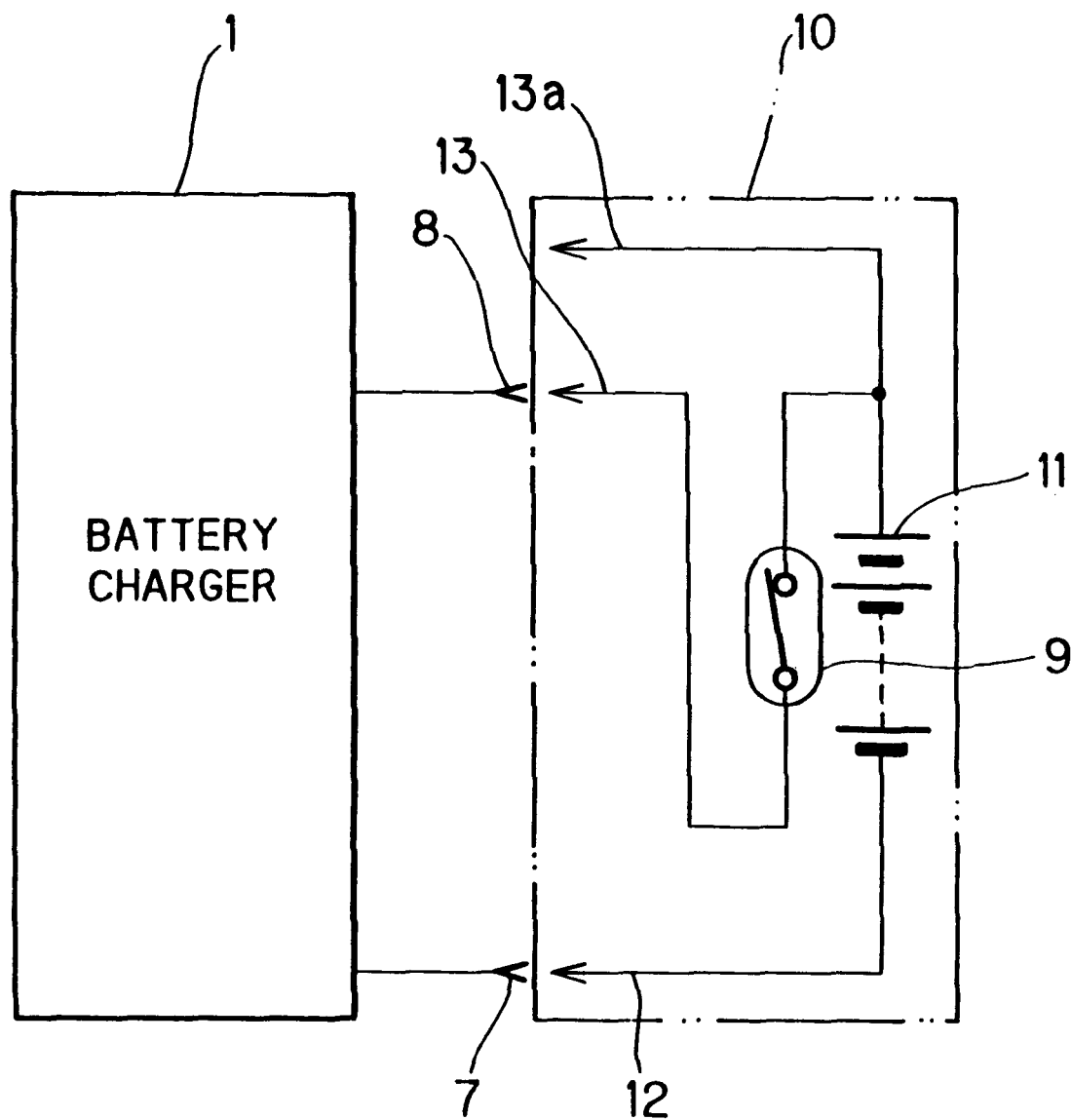
FIG. 1 is a circuitry diagram showing the state of a conventional battery pack connected to a battery charger.

Although the above description has been made to charge a battery pack that does not contain a heat-sensitive switch, the present invention is of course capable of charging a battery pack containing the heat-sensitive switch as shown in FIG. 1.

Although the present invention has been described with respect to a specific embodiment, it will be appreciated by one skilled in the art that a variety of changes may be made without departing from the scope of the invention. For example, certain features may be used independently of others and equivalents may be substituted all within the spirit and scope of the invention.

What is claimed is:

1. A battery pack charger comprising:

an external frame provided with an insertion slot for inserting a battery pack, the battery pack including a battery having a first polarity and a second polarity opposite the first polarity;

a first charging terminal connected to the first polarity of the battery when the battery pack is inserted into the insertion slot;

a second charging terminal connected to the second polarity of the battery when the battery pack is inserted into the insertion slot;

a charging control circuit housed in said external frame, said charging control circuit charging the battery and stopping a charging operation when the battery is fully charged;

a heat-sensitive switch connected between said first charging terminal and said charging control circuit, said heat-sensitive switch disconnecting said charging control circuit from said first charging terminal when said heat-sensitive switch exceeds a predetermined temperature, thereby stopping the charging operation even if said charging control circuit fails to stop the charging operation;

a first lead wire connecting said first charging terminal and said heat-sensitive switch, said first lead wire having a length that does not substantially lose heat transferring from the battery pack to said heat-sensitive switch along said first lead wire; and a second lead wire connecting said second charging terminal and said charging control circuit.

2. The battery pack charger as claimed in claim 1, wherein said external frame is formed with an opening in an inner side thereof for inserting said heat-sensitive switch.

3. The battery pack charger as claimed in claim 1, further comprising a third lead wire connecting said charging control circuit and said heat-sensitive switch, said third lead wire having a length that does not substantially lose heat transferring from said charging control circuit to said heat-sensitive switch along said third lead wire.

4. The battery pack charger as claimed in claim 1, wherein said first charging terminal is provided in a position closer to said heat-sensitive switch than said second charging terminal.

5. The battery pack charger as claimed in claim 1, wherein said heat-sensitive switch is separated from the battery pack by a first partition wall constituting a part of said external frame, heat generated from the battery being transferred to said heat-sensitive switch via the first partition wall.

6. A battery pack charger comprising:

an external frame provided with an insertion slot for inserting a battery pack, the battery pack including a battery having a first polarity and a second polarity opposite the first polarity;

a first charging terminal connected to the first polarity of the battery when the battery pack is inserted into the insertion slot;

a second charging terminal connected to the second polarity of the battery when the battery pack is inserted into the insertion slot;

a charging control circuit housed in said external frame, said charging control circuit charging the battery and stopping a charging operation when the battery is fully charged;

a heat-sensitive switch connected between said first charging terminal and said charging control circuit, said heat-sensitive switch disconnecting said charging control circuit from said first charging terminal when said heat-sensitive switch exceeds a predetermined temperature, thereby stopping the charging operation even if said charging control circuit fails to stop the charging operation;

a first lead wire connecting said first charging terminal and said heat-sensitive switch; and a second lead wire connecting said second charging terminal and said charging control circuit, wherein heat channels are provided that minimize heat loss when heat generated from said battery and said charging control circuit is transferred to said heat-sensitive switch.

7. The battery pack charger as claimed in claim 6, further comprising a third lead wire connecting said charging control circuit and said heat-sensitive switch.

8. The battery pack charger as claimed in claim 7, wherein the heat channels include said first lead wire.

9. The battery pack charger as claimed in claim 8, wherein the heat channels further include said third lead wire.

10. The battery pack charger as claimed in claim 9, wherein said heat-sensitive switch is separated from the battery pack by a first partition wall constituting a part of said external frame.

11. The battery pack charger as claimed in claim 10, wherein the heat channels further include the first partition wall.

12. The battery pack charger as claimed in claim 11, wherein said heat-sensitive switch is separated from said charging control circuit by a second partition wall constituting another part of said external frame.

13. The battery pack charger as claimed in claim 12, wherein the heat channels further include the second partition wall.

* * * * *